(12) United States Patent
Mejia et al.

(10) Patent No.: US 11,907,224 B2
(45) Date of Patent: Feb. 20, 2024

(54) FACILITATING SEARCH RESULT REMOVAL

(71) Applicant: ADOBE INC., San Jose, CA (US)

(72) Inventors: Irgelkha Mejia, Round Rock, TX (US); Michele Saad, Austin, TX (US); Ronald Eduardo Oribio, Austin, TX (US); Robert Burke, Jr., Georgetown, TX (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 17/666,383

(22) Filed: Feb. 7, 2022

(65) Prior Publication Data

US 2023/0252027 A1 Aug. 10, 2023

(51) Int. Cl.
*G06F 16/00* (2019.01)
*G06F 16/2455* (2019.01)
*G06F 16/248* (2019.01)
*G06F 16/242* (2019.01)

(52) U.S. Cl.
CPC ...... *G06F 16/24553* (2019.01); *G06F 16/248* (2019.01); *G06F 16/2445* (2019.01)

(58) Field of Classification Search
CPC ........... G06F 16/24553; G06F 16/2445; G06F 16/248
USPC .................................................. 707/600–899
See application file for complete search history.

(56) References Cited

U.S. PATENT DOCUMENTS

| | | | |
|---|---|---|---|
| 6,487,553 B1 * | 11/2002 | Emens | G06F 16/9038 |
| | | | 707/999.005 |
| 11,257,144 B1 * | 2/2022 | Hamel | G06Q 30/0631 |
| 2007/0043721 A1 * | 2/2007 | Ghemawat | G06F 16/24578 |
| 2013/0060755 A1 * | 3/2013 | He | G06F 16/9535 |
| | | | 707/E17.082 |
| 2015/0324434 A1 * | 11/2015 | Greenwood | G06F 16/00 |
| | | | 707/722 |
| 2017/0177660 A1 * | 6/2017 | Chang | G06F 16/2425 |
| 2017/0371953 A1 * | 12/2017 | Kanjilal | G06F 16/9535 |
| 2018/0189417 A1 * | 7/2018 | Freed | G06F 16/90335 |
| 2019/0303477 A1 * | 10/2019 | Kapinos | G06F 16/9535 |

\* cited by examiner

*Primary Examiner* — Michelle N Owyang
(74) *Attorney, Agent, or Firm* — Shook, Hardy & Bacon L.L.P.

(57) ABSTRACT

The present technology provides for facilitating removal of undesired search results. In one embodiment, a search request including a search term(s) to use for performing a search is obtained. Thereafter, a search query is generated to execute the search. The search query includes the search terms and a removal parameter indicating a particular search result to exclude from search results returned in response to the search request. A set of search results are provided for display via a user device. Such a set of search results can be identified based on execution of the search query and exclude the particular search result.

14 Claims, 10 Drawing Sheets

FACILITATING SEARCH RESULT REMOVAL

BACKGROUND

Many users initiate searches to find information. Oftentimes, however, an extensive amount of search results are presented to the user. As a result, it can be tedious and time consuming to sort through various search results. Further, a user may repetitively view an undesired search result, adding to the tediousness of viewing search results. For example, assume a user inputs a search term(s) and, in response, is presented with a set of search results. Further assume a user views one search result and deems the search result as undesirable to the user. Now assume the user refines the search term(s) and again is presented with the same undesirable search result. Unfortunately, the user may again select the search result to view and, only after viewing again, realize the item is one previously deemed undesired, thereby consuming unnecessary computing and time resources.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

As such, embodiments described herein facilitate removal of undesired search results. In this regard, in accordance with a user specifying an undesired search result, such as a product search result, the search result is removed from presentation. In embodiments, the search result may be removed from presentation in association with the current search and/or subsequent search iterations (e.g., within a search session) such that the search result is no longer presented to the user.

Advantageously, removing search results improves the user search experience by reducing a user's time in revising a search result previously determined to be undesirable to the user. Removing search results further reduces unnecessary use of computing resources used to present an undesired search result and to process user interactions of a user revising a search result previously determined to be undesirable. As such, by employing embodiments of the present innovation, the most relevant items can be selected and presented to the appropriate individuals, for example, by surfacing them in search results without the interruptions of undesired search results. Tailoring search results in a user-centric manner, as described herein, enables users to view data relevant to the user in an efficient and accurate manner.

BRIEF DESCRIPTION OF THE DRAWINGS

The technology described herein is described in detail below with reference to the attached drawing figures, wherein:

FIGS. 2A-2D provide example graphical user interfaces associated with removal of undesired search results, in accordance with aspects of the technology described herein;

DETAILED DESCRIPTION

Figure 1:
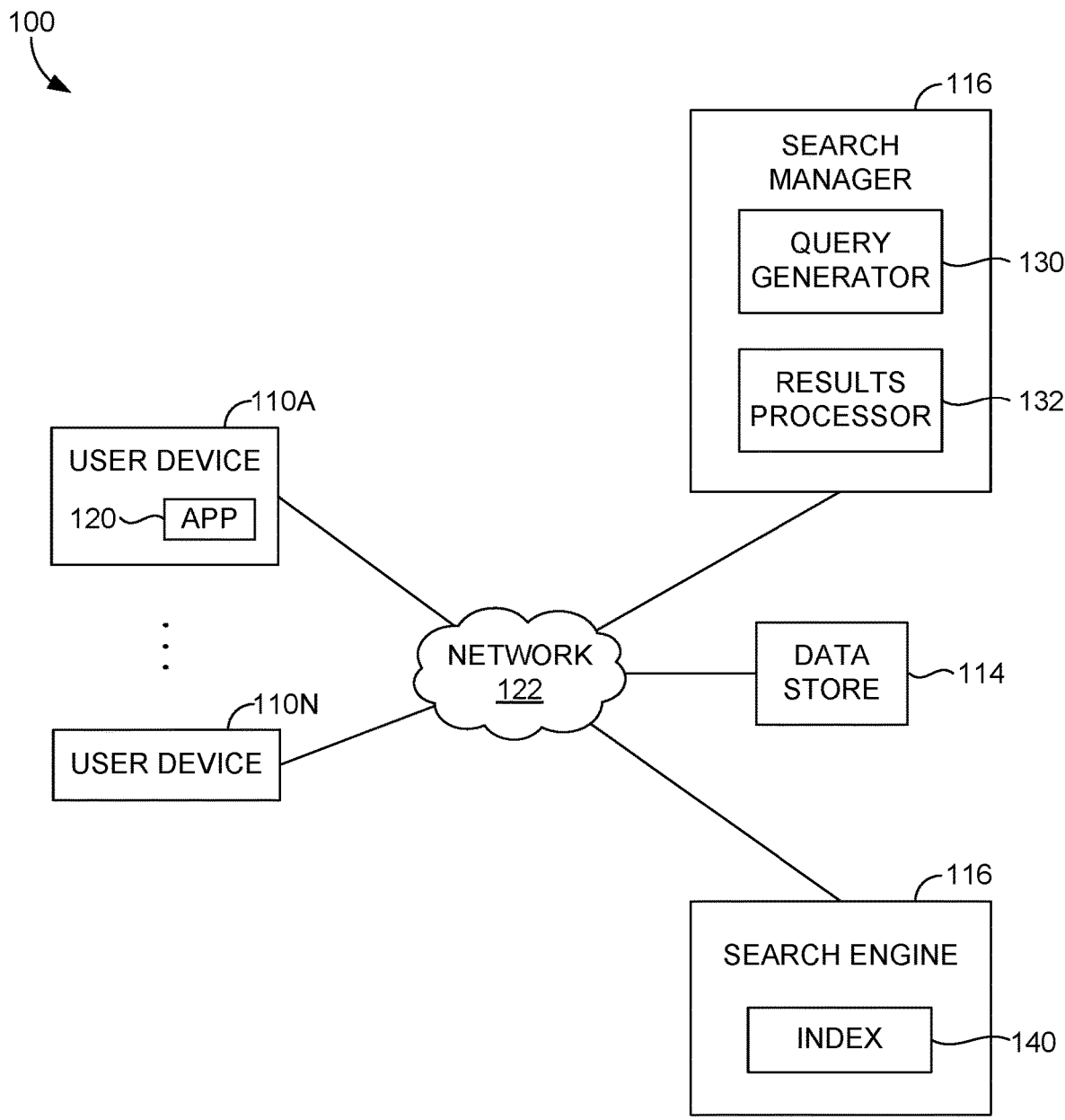
FIG. 1 is a block diagram of an exemplary system for facilitating removal of undesired search results, suitable for use in implementing aspects of the technology described herein.

The technology described herein is described with specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and "block" may be used herein to connote different elements of methods employed, the terms should not be interpreted as implying any particular order among or between various steps herein disclosed unless and except when the order of individual steps is explicitly described.

Overview

In a search environment, numerous search results are often presented to a user. Reviewing an extensive amount of search results to identify desired information can be tedious and time consuming. Oftentimes, a user may repetitively view an undesired search result, adding to the tediousness of viewing search results. For example, assume a user inputs a search term(s) and, in response, is presented with a set of search results. Further assume a user views one search result and deems the search result as undesirable to the user. Now assume the user refines the search term(s) and again is presented with the undesirable search result. In such a case, the presentation of the undesirable search result can result in utilization of unnecessary resources and real estate of the results page. Further, a user may again select the search result to view and realize the item is one previously deemed undesired.

Such a repetitive presentation of an undesired search result can be further problematic in an ecommerce search site. Generally, ecommerce site searches integrate to an ecommerce store to facilitate user shopping. In particular, an ecommerce site search can enable a user to find a desired product on an ecommerce website. A positive shopping experience on an ecommerce website can result in higher conversion rates and a better consumer experience. Repeatedly presenting an undesired product search result, however, can impact the user experience, thereby decreasing the likelihood of conversion and reducing consumer experience.

Further, determining search results to provide to users can be difficult and inaccurate. Generally, different individuals have interests in different items or products, providing even more difficulty and inaccuracy in surfacing data desired by a user. As such, to provide particular data that is desired by a user, many conventional systems utilize filters to enable a user to filter search results, for example, associated with a category or characteristic. For example, assume a user desires to view products with a certain characteristic. In such a case, a user may select that characteristic to view products satisfying that characteristic. Filters generally imply a user knows a desired or undesired characteristic. Further, filters may not exist that account for a desired or undesired attribute. Even with such filtering, a user may still view undesired search results. For instance, even with a filter to present only items within a particular cost range, a user may still view particular items and, for one reason or another, determine that is an undesired product for the individual.

As such, embodiments described herein facilitate removal of undesired search results. In this regard, in accordance with a user specifying an undesired search result, such as a product search result, the search result is removed from presentation. In embodiments, the search result may be removed from presentation in association with the current search and/or subsequent search iterations (e.g., within a search session) such that the search result is no longer presented to the user.

Advantageously, removing search results improves the user search experience by reducing a user's time in revising a search result previously determined to be undesirable to the user. Removing search results further reduces unnecessary use of computing resources used to present an undesired search result and to process user interactions of a user revising a search result previously determined to be undesirable. As such, by employing embodiments of the present innovation, the most relevant items can be selected and presented to the appropriate individuals, for example, by surfacing them in search results without the interruptions of undesired search results. Tailoring search results in a user-centric manner, as described herein, enables users to view data relevant to the user in an efficient and accurate manner.

In operation, to remove an undesired search result(s), a user may provide such an indication. For example, in accordance with presenting a set of search results (e.g., in response to a search request), a user may select or indicate a search result desired to be removed or excluded from search results, such as the current search results and/or subsequent search results presented. Based on the indication to remove a search result, a removal parameter may be generated and used to indicate such a desire. A removal parameter indicating a desire to exclude a particular search result (e.g., product search result) may be accessed and used in a search query generated to perform a search. As described herein, the removal parameter can be accessed or referenced in any of a number of ways. In some cases, the removal parameter may be provided with a search request and, thereafter, used to generate a search query. In other cases, the removal parameter may be referenced from a user profile associated with a user initiating a search request. For instance, in accordance with a user previously selecting to exclude a particular search result, a corresponding removal parameter may be generated and stored in the user profile. As such, when a search request is subsequently initiated in association with the user, the user profile may be accessed to reference the removal parameter and included in a search query being generated. Because the search query being used to execute the search includes the removal parameter, or a representation thereof, the returned search results exclude the search result previously identified as undesirable to the user.

Various terms are used herein to describe various embodiments. Although the terms are described throughout, a brief overview of some of the terms is provided to facilitate an understanding of the present technology.

A search request generally refers to a request to perform a search. A search request may include search terms and/or search operators input by a user at a user device.

A search query generally refers to a query formatted to execute a search. In this regard, a search query is generally generated in accordance with at least some data provided in a search request.

A removal parameter generally refers to a parameter indicating a search result(s) desired to be removed from, or excluded from, a set of search results. In some cases, a removal parameter is specific to one search result. In such cases, for each search result desired to be removed, a separate removal parameter is generated and/or used. In other cases, a removal parameter may indicate a set or plurality of search results desired to be removed.

Overview of Exemplary Environments for
Facilitating Removal of Undesired Search Results Referring initially to FIG. 1, a block diagram of an exemplary network environment 100 suitable for use in implementing embodiments described herein is shown. Generally, the system 100 illustrates an environment suitable for facilitating removal of undesired search results. Among other things, embodiments described herein facilitate removal of search results indicated as undesired by a user. In this regard, search results are customized for the user such that upon a user identifying a search result as undesired or to be removed, the search result is no longer presented to the user (e.g., in association with the current search query and/or subsequent search queries). Generally, as described herein, in accordance with obtaining a search request, a search query is generated for use in performing a search (e.g., via a search engine). Such a search query is generated to include a removal parameter indicating a search result desired to be removed from, or excluded from, a set of search results.

The network environment 100 includes user devices 110a-110n (referred to generally as user device(s) 110), a search manager 112, a data store 114, and a search engine 116. The user device(s) 110a-110n, the search manager 112, the data store 114, and the search engine 116 can communicate through a network 122, which may include any number of networks such as, for example, a local area network (LAN), a wide area network (WAN), the Internet, a cellular network, a peer-to-peer (P2P) network, a mobile network, or a combination of networks.

The network environment 100 shown in FIG. 1 is an example of one suitable network environment and is not intended to suggest any limitation as to the scope of use or functionality of embodiments disclosed throughout this document. Neither should the exemplary network environment 100 be interpreted as having any dependency or requirement related to any single component or combination of components illustrated therein. For example, the user device 110a-110n may be in communication with the search manager 112 via a mobile network or the Internet, and the search manager 112 may be in communication with data store 114 via a local area network. Further, although the environment 100 is illustrated with a network, one or more of the components may directly communicate with one another, for example, via HDMI (high-definition multimedia interface), and DVI (digital visual interface). Alternatively, one or more components may be integrated with one another, for example, at least a portion of the search manager 112 and/or data store 114 may be integrated with the user device 110 and/or search engine 116. For instance, a portion of the search manager 112 may be integrated with a server (e.g., search engine), while another portion of the search manager 112 may be integrated with the user device (e.g., via application 120).

The user device 110 can be any kind of computing device capable of facilitating removal of undesired search results. For example, in an embodiment, the user device 110 can be a computing device such as computing device 700, as described above with reference to FIG. 7. In embodiments, the user device 110 can be a personal computer (PC), a laptop computer, a workstation, a mobile computing device, a PDA, a cell phone, or the like.

The user device can include one or more processors, and one or more computer-readable media. The computer-readable media may include computer-readable instructions executable by the one or more processors. The instructions may be embodied by one or more applications, such as application 120 shown in FIG. 1. The application(s) may generally be any application capable of facilitating removal of undesired search results. In some implementations, the application(s) comprises a web application, which can run in a web browser, and could be hosted at least partially server-side (e.g., via search manager 112 and/or search engine 116). In addition, or instead, the application(s) can comprise a dedicated application. In some cases, the application is integrated into the operating system (e.g., as a service). As one specific example application, application or service 120 may be or include a search tool that provides various search results. For instance, application 120 may include an ecommerce website that incorporates a search tool to search for various products.

User device 110 can be a client device on a client-side of operating environment 100, while search manager 112 and/or search engine 116 can be on a server-side of operating environment 100. Search manager 112 and/or search engine 116 may comprise server-side software designed to work in conjunction with client-side software on user device 110 so as to implement any combination of the features and functionalities discussed in the present disclosure. An example of such client-side software is application (or service) 120 on user device 110. This division of operating environment 100 is provided to illustrate one example of a suitable environment, and it is noted there is no requirement for each implementation that any combination of user device 110, search manager 112, and/or search engine 116 to remain as separate entities.

In an embodiment, the user device 110 is separate and distinct from the search manager 112, the data store 114, and the search engine 116 illustrated in FIG. 1. In another embodiment, the user device 110 is integrated with one or more illustrated components. For instance, the user device 110 may incorporate functionality described in relation to the search manager 112. For clarity of explanation, embodiments are described herein in which the user device 110, the search manager 112, the data store 114, and the search engine 116 are separate, while understanding that this may not be the case in various configurations contemplated.

As described, a user device, such as user device 110, can facilitate removal of undesired search results. Search results generally refer to any type of search results provided in response to a search request or search query. In some embodiments, search results are product search results returned in association with a search for product items. A search result may include various aspects of information, such as link, a description (e.g., product cost, product overview, product name, product details, snippet), an image (e.g., product image), etc. As described herein, an undesired search result refers to a search result for which a user has specified as undesirable or to remove the search result from being presented to the user, or has otherwise indicated that the search result is undesired to be viewed.

A user device 110, as described herein, is generally operated by an individual or entity intending to view, or that is viewing, search results, or otherwise interacting with a search tool (e.g., via a website). In embodiments, a search for search results can be initiated at the user device 110. For example, in some cases, a user may provide a set of search terms or select an option or link to initiate a search for relevant item or search results (e.g., product search results).

Initiating a search can be performed in any number of ways and is not intended to be limited herein. As one example, a user may input a search term(s) and/or a search operator(s) into a search box, for example, via application 120. A search term generally refers to any set of characters or words desired to be used in a search. A search operator refers to a special character and/or command that extend capabilities to refine search results. Examples of search operators in include "and," "or," "not," etc. As described, the user device 110 can include any type of application for use in performing a search and may be a stand-alone application, a mobile application, a web application, or the like. In some cases, the functionality described herein may be integrated directly with an application or may be an add-on, or plug-in, to an application. Examples of applications that may be used to initiate and/or present search results include ecommerce websites or business-to-business websites that include search functionality.

In accordance with inputting a search term(s) and/or selecting to initiate the search (e.g., via selection of a search box or icon), a search request may be communicated to the search manager 112. As can be appreciated, the search request may include the search terms and/or search operators input by the user. In response to the search request, the user device 110 may obtain a set of search results to present to the user, for example, via application 120.

Upon presenting a set of search results, identification of an undesired search result(s) may be initiated by a user, for example, via application 120 operating on the user device 110. In this regard, the user device 110, via application 120, might allow a user to select an undesired search result. Selection of an undesired search result may be performed in any number of ways. As one example, a user may select a search result removal indicator, such as a link or text indicating to "remove from session search results." In some cases, a search result removal indicator may be presented within the context or display of a group of search results. For example, a plurality of search results may be presented with each search result having a search result removal indicator presented in association therewith. Alternatively or additionally, a search result removal indicator may be presented in accordance with viewing a particular search result. To this end, in cases in which a user has selected to view a particular search result (e.g., product item), the search result may be presented (e.g., in place of the plurality of search results or in a new window) along with a search result removal indicator. As another example, a search result removal indicator may be presented (e.g., as a menu option) upon a user right clicking or hovering over a search result. Other examples of selecting or indicating to remove a search result can be contemplated, such as for example, using a swiping motion associated with a search result presented via a touchscreen display (e.g., a mobile device).

In accordance with embodiments described herein, upon selecting to remove a search result (e.g., via a search result removal indicator), the search result is removed from a set of currently presented search results and/or subsequently presented search results. In this regard, in some embodiments, upon selecting to remove a particular item from search results, that particular item is automatically removed and no longer provided in the set of search results presented to the user. Additionally or alternatively, upon selecting to remove a particular item from search results, that particular item is automatically removed and no longer provided in a set of search results presented to the user in response to a subsequent search request(s). In this way, if a user refines or modifies the search terms or provides a new set of search terms, the particular search result is excluded from the presented search results corresponding with the refined/new search terms.

To remove the search result from currently presented search results and/or subsequently presented search results, a representation of the desire to remove the search result may be communicated and/or stored. A representation of the desire to remove a search result may be in any form. As one example, a removal parameter indicating a particular search result may be used. A removal parameter may be in any number of formats, including various text, characters, etc. As described herein, upon detecting a user selection of an undesired search result, a removal parameter may be generated and/or communicated to the search manager 112 and/or data store 114.

In some cases, such a removal parameter may be stored (e.g., in association with a user profile for the user) for subsequent access to use in generating a search query for performing a search. In some cases, the removal parameter is stored in a data store accessible by the search manager 112. In this regard, when the search manager 112 obtains a search request, the removal parameter can be accessed and used to generate a search query. In other cases, the removal parameter is stored in a data store accessible by the user device. In such cases, the user device may access the removal parameter to communicate to the search manager 112. For instance, in accordance with a subsequent search request generated and provided by the user device to the search manager 112, the user device may access the removal parameter and provide the parameter in association with the search request (e.g., within the search request or separate from the search request).

As can be appreciated, in some embodiments, a removal of search results may be maintained during a search session. In this regard, search results provided in response to any search request initiated during a search session may exclude the undesired search results. A search session can be defined in any number of ways. As one example, a search session includes a time from a user login to a time of user logout. In other cases, a search session may begin at a time a user accesses a search tool or a user logins and may end upon a lapse of a time duration (e.g., one day, one week, etc.). A search session may be defined in any number of ways and is not intended to limit the scope of embodiments described herein.

Various other functionalities related to search results removal may be performed in accordance with the user device 110, and/or application 120. In this regard, user-centric preferences may be provided by a user and, thereafter, used to enhance desirability of search results presented to the user. As one example, in some embodiments, an indication of the removed search result may be presented to the user. In this regard, the removed search result indicator may serve as a reminder or notice to the user that the particular search result was removed from the search results. For instance, although a search result is not presented in a search result listing, an indication that the search result has been removed from the search results may be presented to the user.

As another example, in some cases, a user may select to restore a search result(s) such that it is presented in association with relevant searches. For example, assume an indication of the removed search result is presented on a display screen along with an option to restore the search result. In such a case, a user may select to restore a particular search result or a set of search results (e.g., all removed search results). In accordance with a subsequent search that would include the previously removed search result, the search result may now be included in the search results and presented to the user. In some implementations, to do so, the removal parameter may be deleted from storage (e.g., in association with the user profile) such that it is no longer accessed to facilitate generation of a search query.

As yet another example, in some cases, a user may select to save a removed search result list. The removed search result list may be named, either automatically or based on user input. In this regard, assume a user desires to view a prior search session that removed the search results, the previous search session with the removed search results can be easily and efficiently presented.

As yet another example, in some cases, a user may select weights associated with search results. For instance, a user may select weightings on importance or desirability of various aspects of search results. By way of example only, a user may select or provide input (e.g., via slides or scales) indicating desirability of product characteristics, such as price, size, color, etc.

Any of such user-centric preferences may be communicated to the search manager 112 and/or stored in a data store (e.g., in association with a user profile). For example, such preferences may be communicated to the search manager 112 via a search request. Thereafter, the preferences may be stored in data store 114 in association with a user profile for the user such that the preferences can be accessed to generate subsequent search queries and/or process search results.

The user device 110 can communicate with the search manager 112 to facilitate removal of search results. For instance, in some embodiments, the network 122 might be the Internet, and the user device 110 interacts with the search manager 112 to initiate a search, provide an indication of undesired search results, and/or the like. In other embodiments, for example, the network 122 might be an enterprise network associated with an organization. It should be apparent to those having skill in the relevant arts that any number of other implementation scenarios may be possible as well.

With continued reference to FIG. 1, the search manager 112 can be implemented as server systems, program modules, virtual machines, components of a server or servers, networks, and the like. At a high level, the search manager 112 manages searches initiated via user devices, such as user device 110. In particular, the search manager 112 can obtain search requests from user device(s) 110. As described, search requests may include search terms and/or search operators specified by a user for use in performing a search. Using a search request, the search manager 112 can generate a corresponding search query to execute a search to identify relevant search results. Generally, the search manager 112 can receive search requests from any number of devices. As such, the search manager 112 can obtain search requests from various user devices, such as user devices 110a-110n.

The search manager 112 may include a query generator 130 and a results processor 132. According to embodiments described herein, the search manager 112 can include any number of other components not illustrated. In some embodiments, one or more of the illustrated components 130-132 can be integrated into a single component or can be divided into a number of different components. Components 130-132 can be implemented on any number of machines and can be integrated, as desired, with any number of other functionalities or services.

The query generator 130 is generally configured to generate search queries to perform or execute a search. A search query generally refers to the query in the form that is applied to perform a search or executed as a search. In this regard, the search query includes data that can be used by a search engine to perform a search. In accordance with embodiments described herein, query generator 130 generates search queries that include removal parameters, as appropriate. In this regard, a search query may be generated to include search terms and removal parameters for search results identified as desired to be removed from search results. As can be appreciated, the search query may include any number or type of parameters. For example, other types of parameters may include parameters for applying logic, parameters for ranking or prioritizing search results, parameters for applying a filter(s), etc.

To generate a search query, the query generator 130 may analyze a search request, including any search terms and/or search operators included in the search request. Such search terms/operators can be included in the search request. Further, the query generator 130 may identify any appropriate parameters to include in the search query. As such, the query generator 130 may identify any appropriate removal parameters to be included or referenced in the search query.

In some embodiments, a removal parameter(s) may be provided or indicated in a received search request, or other communication from a user device. In this regard, when the user device (e.g., via application 120) generates a search request to include search terms, the search request may also include removal parameters (e.g., as identified from user input or accessed via a user profile storing such data).

In other embodiments, a removal parameter may be identified or determined in accordance with obtaining the search request. For example, in cases that a search request is received in association with a particular user device or user, the query generator 130 may reference (e.g., via data store 114) any relevant removal parameters and include such parameters in the search query. In some cases, a user profile stored in the data store 114 may include various user preferences, including removal parameters. As described, in some cases, the removal parameters associated with a particular search session may be referenced and used. Further, in cases in which a search is saved, relevant removal parameters for that saved search may be accessed when the saved search is selected by a user.

As described, embodiments herein include user-centric preferences for viewing search results. One example of such user-centric preferences include user-provided weightings associated with search results, or aspects thereof. For example, a user may select a weighting indicating a desire or interest in association with various product features, such as size of products, colors of products, prices of products, etc. As such, the query generator 130 may generate a search query with such additional user-configured parameters. Such additional user-configured parameters may be obtained in any number of ways. For example, additional user-configured parameters may be obtained in association with a search request, looked-up in a data store (e.g., via a user profile), etc.

Query generator 130 may be configured in any number of ways. In some embodiments, the query generator 130 may be or include a request handler and a query parser, as described in more detail below with reference to FIG. 3. In some cases, the query generator 130, or a portion thereof, may operate at the user device (e.g., via an application) or operate remote from the user device (e.g., via a server associated with an application and/or website). Further, query generator 130 may generate queries in accordance with any number of formats. As such, any type and number of parameters may be contemplated for use by the query generator 130 to include in, or in association with, a search query.

Upon generating a search query in association with a search request, the query generator 130 can provide the search query for use in generating search results. In this regard, the query generator 130 may provide the search query to search engine 116 to execute the query. The search engine 116 may be any type of search engine capable of carrying out searches. The search engine 116 may include an index 140 used for searching for search results (e.g., product search results) relevant to the search query. As one example, index 140 may include a set of product items that are searched to identify product search results relevant to a search query. An index may be in any number of forms capable of being searched.

In response to performing a search, the results processor 132 can obtain search results, for example, from the search engine 116. The results processor 132 obtains a set of search results and can format the search results to provide as a response to the user device 110. Search results can be formatted in any number of ways. In some cases, the results processor 132 may generate an order for the search results, faceting search results (e.g., arranging search results into categories, for example based on indexed terms), or otherwise manages a presentation of the search results. The results processor 132 can communicate the search results (e.g., via a query response) to the user device for presentation to the user (e.g., via application 120).

Although not illustrated, the query processor 130 and/or results processor 132 may include, or communicate with, a machine learning model to train and/or use a model to predict data related to search result removal. In particular, as various users provide indications of undesired search results (e.g., product items), machine learning may be employed to analyze such data and provide inferences related thereto. For example, patterns in relation to undesired search results may be learned (e.g., in reference to presentation of search result, such as location of search result; particular brands/collections of undesired search results; particular undesired product attributes, such as color, size, etc.; and/or the like).

In some cases, inferences or predictions identified via machine learning can be used to modify a search index. For example, based on relevant inferences or predictions, additional data items may be appended into the index. By way of example only, weights may be predicted and added to the index to provide an indication of desirability of entries in the index (e.g., related to various products). In this regard, the weights may impact a search result ranking and, as such, a position or placement in a search results page for various search results. By way of example only, assume a trend is identified that indicates 75% of shoppers are excluding a particular item from the corresponding search results. In such a case, the index entry corresponding with that particular item may include a weight that results in the particular item being presented as a lower ranking in the search results. Machine learning may additionally or alternatively be used to make predictions or inferences in relation to a particular user or users similar to a particular user. For example, assume a user selects to exclude a search result across multiple search sessions. In such a case, the machine learning model may result in a prediction that such a search result should be excluded or lower ranked, or that other similar items should be excluded or lower ranked.

In addition or in the alternative to modifying a search index, machine learning may be used to effectuate enhanced search results in other manners. For example, inferences learned from machine learning may be used by the results processor 132 to modify results or format results for presentation. As another example, inferences learned from machine learning may be provided to the user device 110 or query generator 130 (or data storage associated therewith) to use in generating a search query. For instance, assume a removal parameter is used for one shopper. Now assume that machine learning is used to identify that another shopper is similar and would benefit from not viewing the search result. In such a case, the removal parameter may be stored in association with the other similar shopper for use in generating search queries.

Figure 2A:
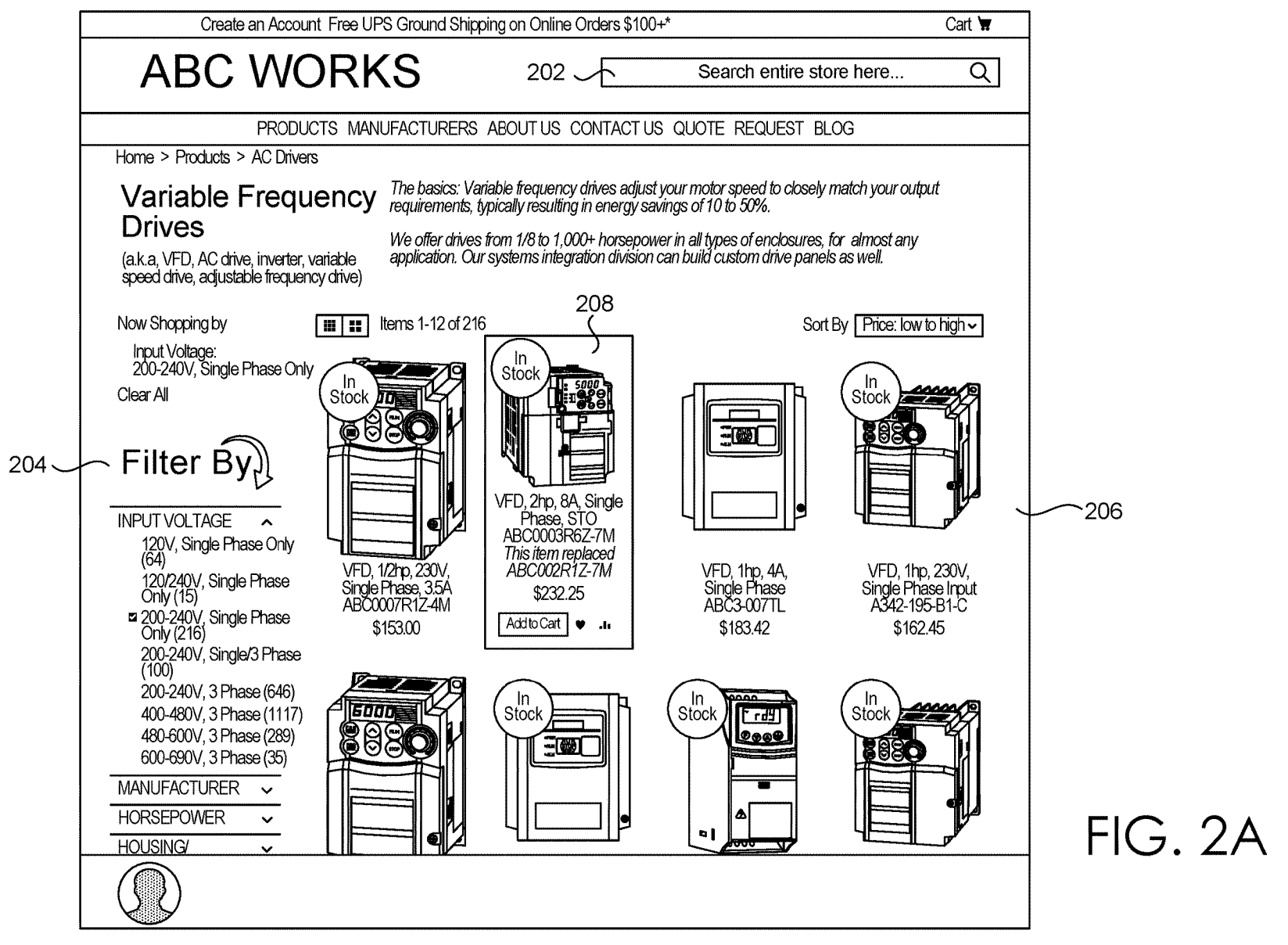
Figure 2B:

By way of example, and with reference to FIGS. 2A-2D, FIGS. 2A-2D provide example graphical user interfaces for implementing various aspects of the technology described herein. As shown in FIG. 2A, assume a user is visiting a website having a search tool 202 and has input a search term of variable frequency drives, via a search input box, to receive a set of search results. In some cases, a user may select to filter 204 the search results to view search results 206 having a particular attribute or set of attributes. Now assume a user is interested in product 208 and, as such, the user selects product 208 in the search results to view more details, or a product page, pertaining to the product.

With reference to FIG. 2B, an example product page 220 associated with the selected product is shown. Now assume in viewing the product details, the user realizes that the product 208 is not desired to be viewed in the search results. For example, the user may recognize that there is some undesirable attribute associated with this particular product (e.g., and not specified via a particular filter). As such, the user may select to remove the search result from the search results page (e.g., to avoid subsequently reviewing this product description). For instance, in FIG. 2B, the user may select the "Remove From Session Search Results" representation 222 to initiate the removal of the particular product from the search results page. Although this example provides the search result removal indicator within the product page, such an indicator may alternatively or additionally be provided in the search results page in association with the particular search result.

Figure 2C:
Figure 2D:
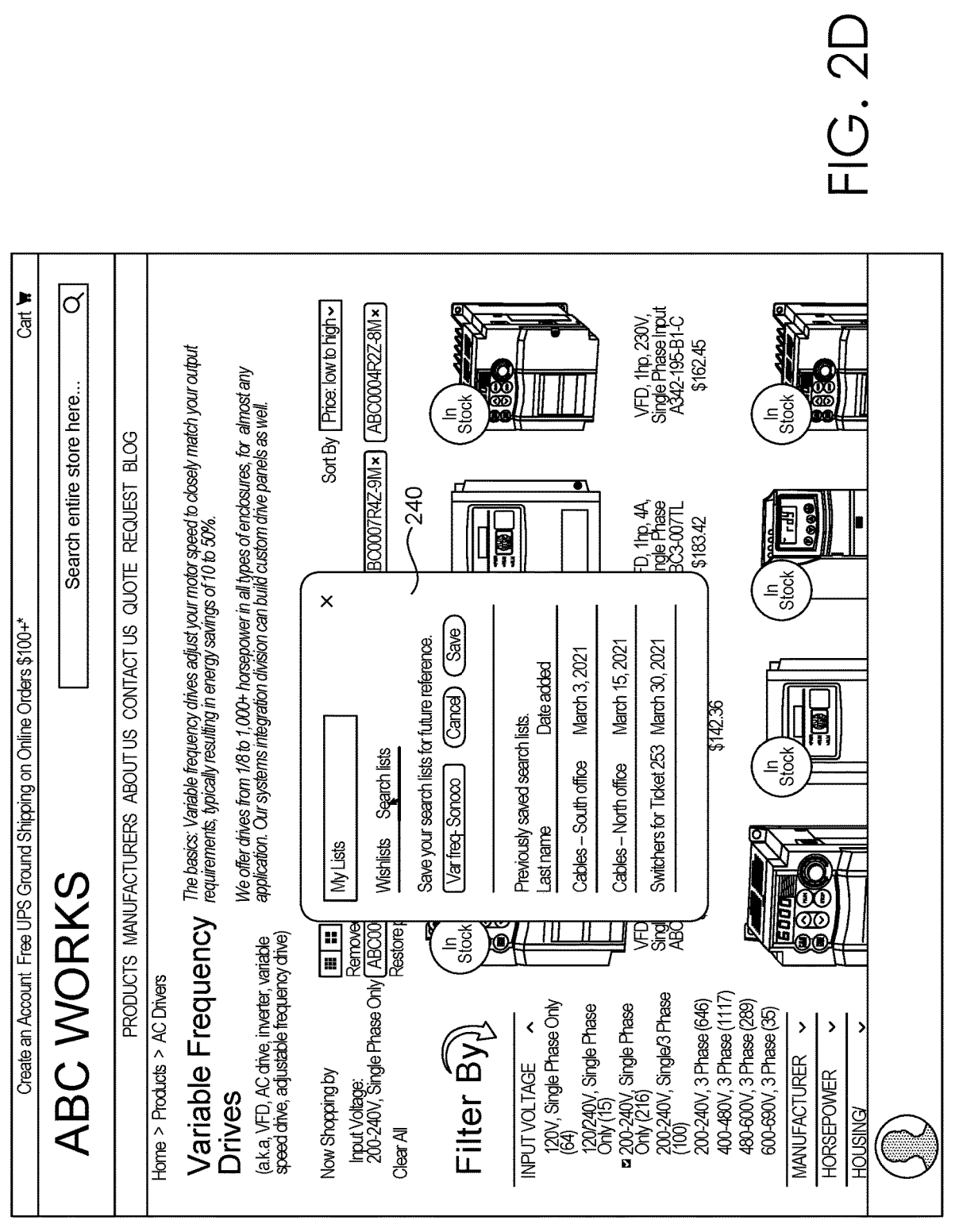

As described herein, the selection to remove from the session search results can prevent that particular product item from appearing in the current set of search results and/or subsequent search result sets presented in response to search requests. For example, as shown in FIG. 2C, the particular product (product 208 in FIG. 2A) is no longer provided in the search results 230 presented to the user. In some cases, the undesired product may be immediately removed, that is, from the currently presented search results. In other cases, the undesired product is removed in accordance with sending another search request. Such a search request may be automatically sent based on the selection to remove the particular product or may be prompted based on a user updating or refining a search term(s) or providing a new search term(s).

As shown in FIG. 2C, a graphical user interface may provide an indication of a search result removed from the search results. For example, removed search result indicator 232 provides a notification or reminder to the user that the particular product was removed from the search results. A user may also be able to restore the search result to the set of search results. For example, a user may select to the "Restore products" representation 234 to restore the particular product to the search results page. Although the representation to restore is illustrated as text, as can be appreciated, this could be presented in any number of formats. For instance, an image of the item as a candidate to restore may be provided in a thumbnail representation.

Assume a user desires to save the search list. In such a case, the user may select a "Save search list" representation 236. In such cases, a menu 240 of FIG. 2D may be presented. As shown, the user may name the search list to save for future reference. Assuming the user saves the search list, a user may subsequently access the saved search list and view search results with the saved removed products being excluded from the search results (but may include it listed as among products removed from the search results list).

Figure 3:
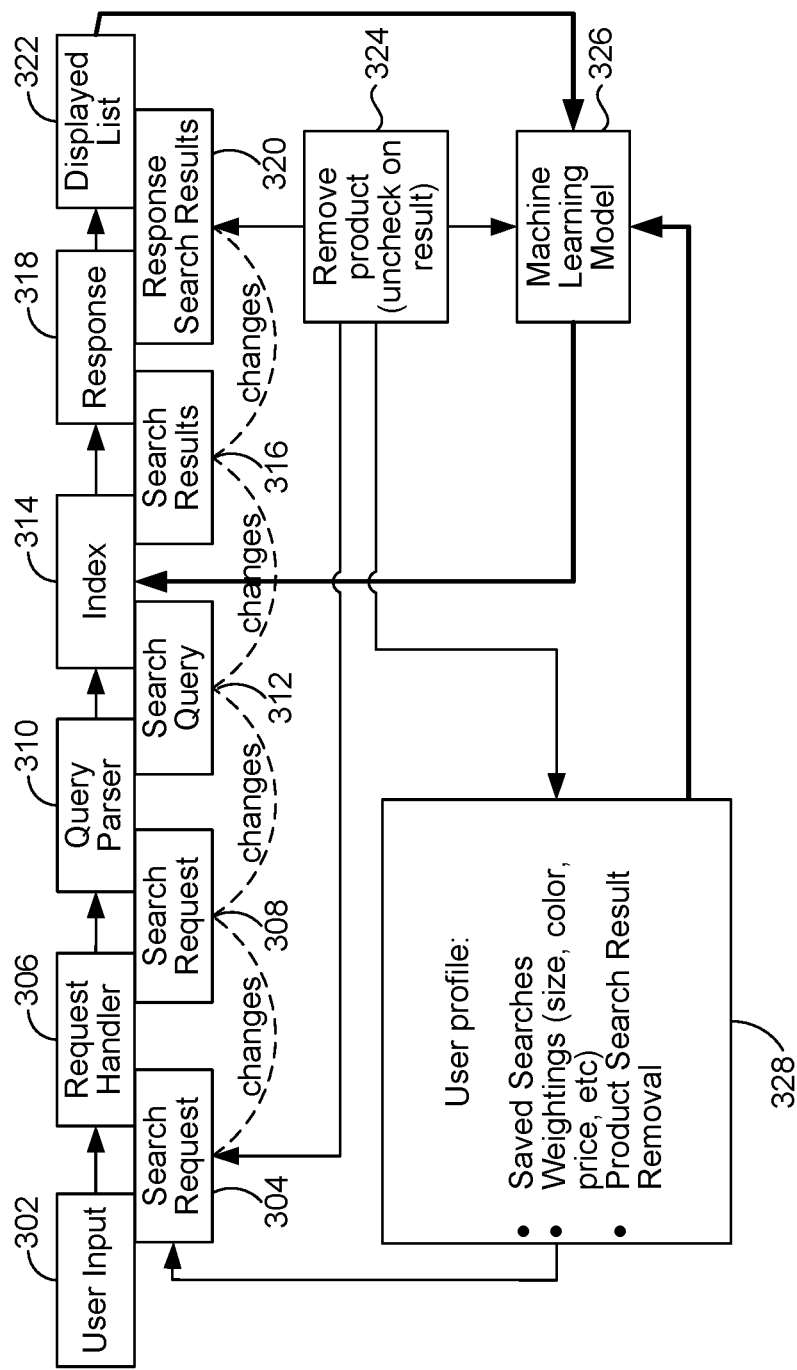
FIG. 3 is an example implementation for performing removal of undesired search results, in accordance with aspects of the technology described herein.

FIG. 3 provides an example process flow that may be implemented, in accordance with embodiments described herein. With regard to FIG. 3, user input 302 is provided. User input 302 may include various amounts of information. For example, in embodiments, user input includes one or more search terms and/or search operators desired by a user to perform a search. Such user input 302 can be input into an application (e.g., via a web site) at a user device. The user input can be included in a search request 304 to request performance of a search. The request handler 306 can obtain the search request and analyze the request. For example, the request handler 306 may configure or organize the request or define logic to be used to process the request. Any of a variety of request handlers can be used. A query parser 310 may then be used to parse the search request 308 and generate a search query 312 that can be used to perform a search. For example, query parser 310 may interpret terms and/or parameters, analyze for syntactical errors, and use such analysis to generate a search query in a format configured to perform a search with a search engine (e.g., translating the search request to a format understood by a search engine, or a portion thereof). In other words, the query parser 310 can generate the formatted output for executing a query.

As can be appreciated, the search request 308 may be the same request as search quest 304, a modified version of search request 304, etc. Further, as described herein, parameters, such as removal parameters, among others, can be added at any point in the process flow. For example, parameters may be included in the search request 304 before being analyzed at the request handler 306, in the search request 308 based on analysis by the request handler 306, in the search query 312 based on analysis by the query parser, and/or the like. In this way, the parameters may be identified at any point along the process (e.g., based on receiving the parameters or accessing the parameters, for example, via a user profile or other data store). The request handler 306 and the query parser 310 can perform various functionalities, only some of which are described herein. Further, the request handler 306 and the query parser 310 can perform functionality described in association with the query generator 130 of FIG. 1.

The search query 312 can then be used to perform a search to identify relevant search results. As shown, the search query is provided to the index 314 for executing the search. The index 314 may be part of a search engine, such as search engine 116 of FIG. 1. The index 314 can output search results 316. The search results 316 are used to generate a response for providing the response search results 320 for display via a user device. In embodiments, the response may be generated in light of various analysis, such as faceting, highlighting, ranking, etc. In this regard, the displayed list of search results 322 is provided in an efficient and effective manner for viewing.

As shown at block 324, assume a user selects a product search result to remove. For example, a user may interact with the displayed list 322 to select a search result to remove from the current and/or subsequent search result listings. Such feedback can be provided to various components as described herein. As one example, the product search result removal is provided to generate a new search request to update the search results. In this regard, a removal parameter may be generated and added to search request 304, search request 308, and/or search query 312 to initiate a new search that will result in exclusion of the selected product search result. As another example, an indication of the product search result removal is provided to a user profile 328 to store the indication (e.g., via a removal attribute) in association with the user profile. In such a case, at a subsequent user input, search request generation, and/or search query generation, a removal attribute can be included therein to effectuate a search that excludes the selected product search result. Such a product search result removal may occur in association with any number of subsequent searches performed (e.g., during a common search session). Further, as shown, other data may be accessed via a user profile and used to supplement a search request and/or search query with other user-centric attributes. For example, various attribute weightings and/or saved searches may be included in a user profile. Although FIG. 3 illustrates the user profile in connection with the search request 304, embodiments are not intended to be limited thereto and, alternatively or additionally, the user profile may be accessed in association with request handler 306, query parser 310, among others.

As yet another example, the product search result removal may be provided to a machine learning model 326 to train and/or infer various aspects related to search result removal. Other data may additionally or alternatively be provided to machine learning model 326. For example, selections made in association with the displayed list 322 may be provided to machine learning model 326 (e.g., purchased items, etc.). Further, user profile data (e.g., removed search results, attribute weightings, etc.) may be provided to the machine learning model 326. The machine learning model 326 may use such data to predict or infer information. For instance, the machine learning model 326 may be configured to predict information based on input that is used to modify the index 314 (e.g., add a field to the index, update fields in the index, etc.).

Exemplary Implementations for Removal of Undesired Search Results

Figure 4:
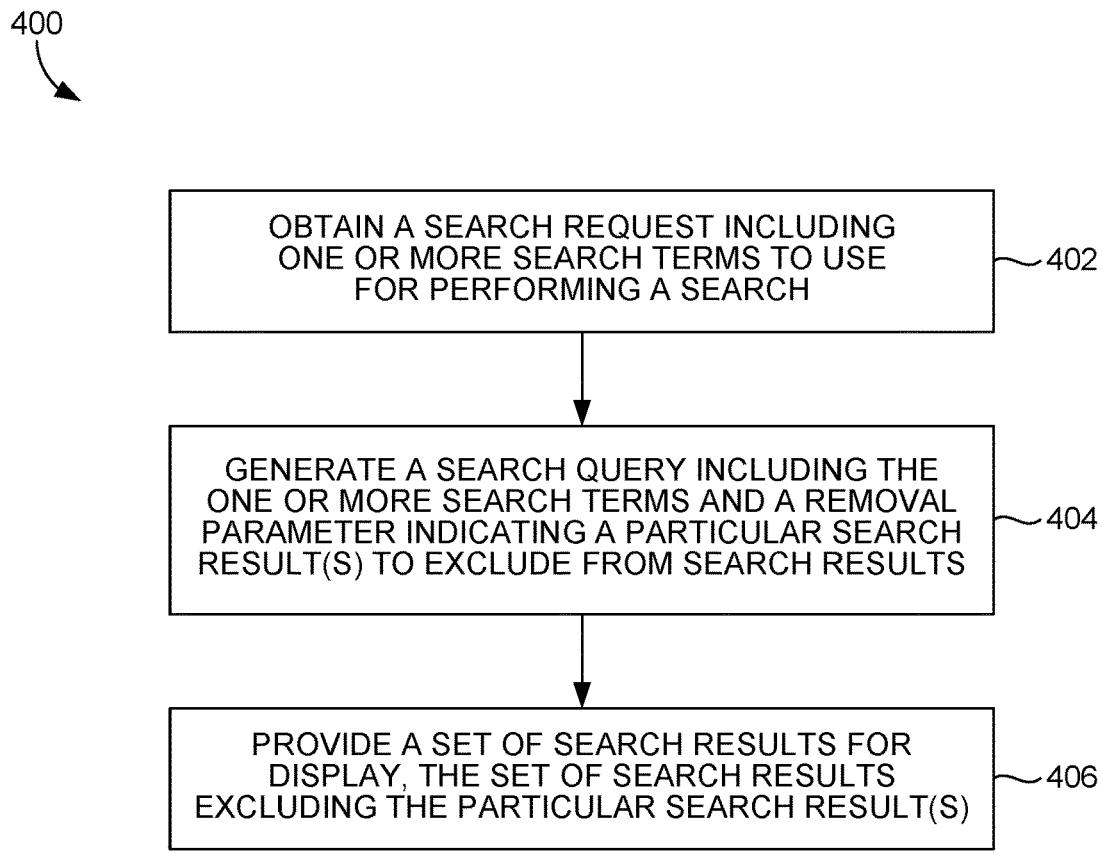
FIG. 4 provides a first example method for facilitating removal of undesired search results, in accordance with aspects of the technology described herein.
Figure 5:
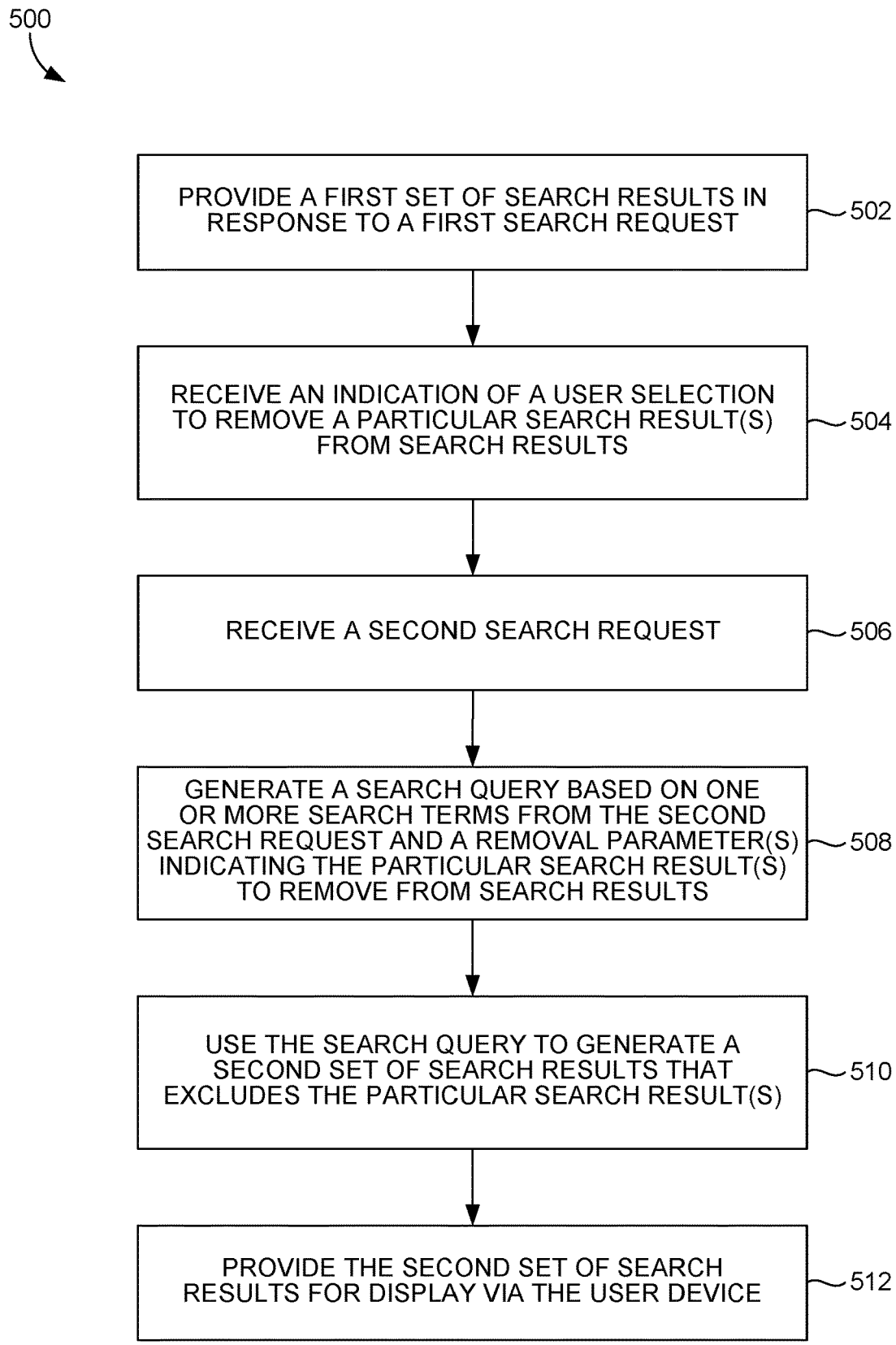
FIG. 5 provides a second example method for facilitating removal of undesired search results, in accordance with aspects of the technology described herein.
Figure 6:
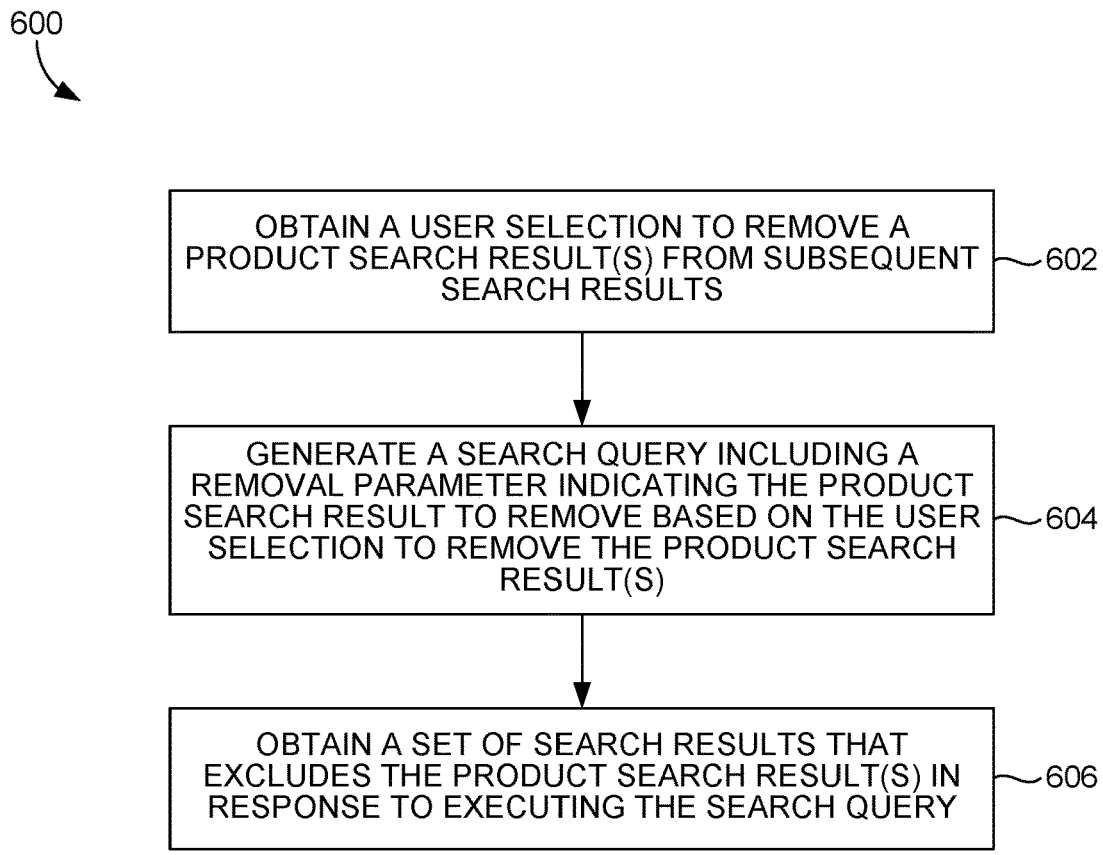
FIG. 6 provides a third example method for facilitating removal of undesired search results, in accordance with aspects of the technology described herein.

As described, various implementations can be used in accordance with embodiments described herein. FIGS. 4-6 provide methods of facilitating removal of undesired search results, in accordance with embodiments described herein. The methods 400, 500, and 600 can be performed by a computer device, such as device 700 described below. The flow diagrams represented in FIGS. 4-6 are intended to be exemplary in nature and not limiting.

Turning initially to method 400 of FIG. 4, method 400 is directed to facilitating removal of desired search results, in accordance with embodiments of the present technology. Initially, at block 402, a search request including one or more search terms to use for performing a search is obtained. A search request may be received from a user device based on user input. For example, a user may desire to initiate a search and input desired search terms.

At block 404, a search query is generated to execute the search. In embodiments, the search query includes the one or more search terms and a removal parameter indicating a particular search result(s) to exclude from search results returned in response to the search request. Such a removal parameter may be included in the search query based on a user selection to indicate a desire to exclude the particular search result(s) from search results (e.g., current or subsequent search results). In some cases, the search request may include the removal parameter, or indication thereof. In other cases, the search request may be identified by accessing a user provide associated with a user providing the one or more search terms. In some implementations, including the removal parameter in the search query may be based on determining that the search request was communicated in association with a same search session during which a user selected to exclude the particular search results.

At block 406, a set of search results is provided for display via a user device. In embodiments, the set of search results excludes the particular search result(s) and is identified based on execution of the search query. In some embodiments, the set of search results are presented in association with an indication of the excluded particular search result(s). For example, along with a set of search results, the search results page may include an indication that one or more products are excluded from the search results.

Turning now to FIG. 5, method 500 is directed to another method of facilitating removal of undesired search results, in accordance with embodiments of the present technology. Initially, at block 502, a first set of search results is provided, for display via a user device, in response to a first search request.

At block 504, an indication of a user selection to remove a particular search result(s) from search results is received. A user may provide such a selection in any number of ways. As one example, a user may select text presented adjacent to a search result that indicates to remove the search result.

At block 506, a second search request is received. In some cases, the second search request is communicated from a user device based on a user selection to remove the particular search result(s) from search results. In other cases, the second search request is communicated from the user device based on a user-provided search term or search term modification.

At block 508, a search query is generated based on one or more search terms from the second search request and a removal parameter(s) indicting the particular search result(s) to remove from search results. At block 510, the search query is used to generate a second set of search results that excludes the particular search result(s). In this regard, a search can be performed using the search query to return the second set of search results. Because of the removal parameter(s) referenced in the search query, the returned results can exclude the particular search result(s).

At block 512, the second set of search results is provided for display via the user device. As described, the second set of search results excludes the particular search result(s) from the second set of search results based on the user selection to remove the particular search result(s) from search results. In embodiments, a search result restoration prompt may be presented to enable a user to restore the excluded/removed search results.

Turning now to FIG. 6, method 600 is directed to another method of facilitating removal of an undesired search result(s), in accordance with embodiments of the present technology. Initially, at block, 602, a user selection to remove a product search result(s) from subsequent search results is obtained. As can be appreciated, in embodiments, a user selection may be provided in association with display of a plurality of product search results including the particular product search result(s) identified for removal.

At block 604, a search query including a removal parameter indicating the product search result(s) to remove is generated based on the user selection to remove the product search result(s). In some cases, the removal parameter may be identified based on a search request provided from the user device. In other cases, the removal parameter may be identified from a data store, wherein the removal parameter, or a representation thereof, is stored in association with a user profile based on the user selection to remove the product search result(s).

At block 606, in response to executing the search query, a set of search results that excludes the product search result(s) is obtained. At block 608, the set of search results that excludes the product search result(s) is output for display via a user device. In embodiments, the set of search results may be concurrently displayed with an indication of the excluded product search result.

Overview of Exemplary Operating Environment

Having briefly described an overview of aspects of the technology described herein, an exemplary operating environment in which aspects of the technology described herein may be implemented is described below in order to provide a general context for various aspects of the technology described herein.

Figure 7:
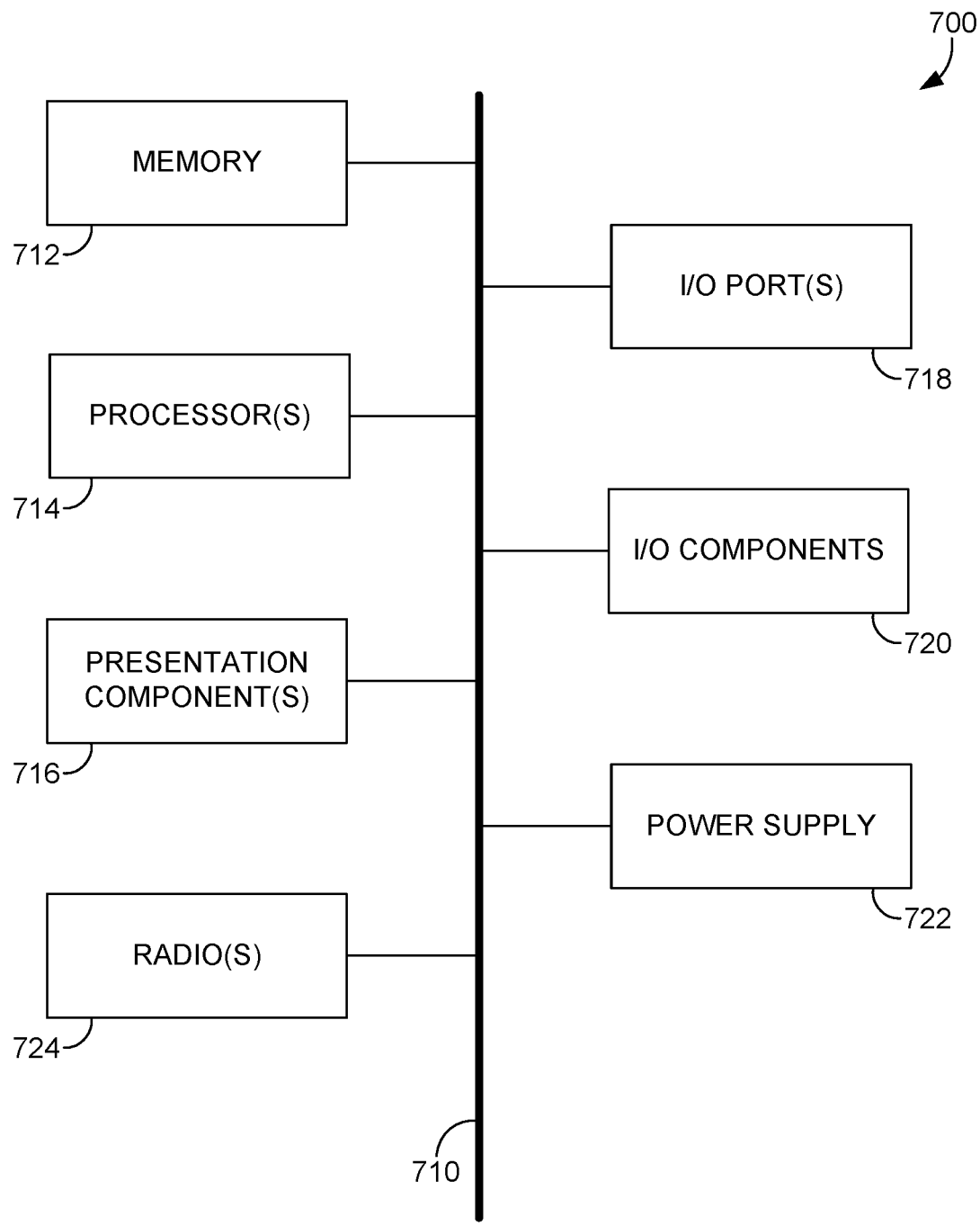
FIG. 7 is a block diagram of an exemplary computing environment suitable for use in implementing aspects of the technology described herein.

Referring to the drawings in general, and initially to FIG. 7 in particular, an exemplary operating environment for implementing aspects of the technology described herein is shown and designated generally as computing device 700. Computing device 700 is just one example of a suitable computing environment and is not intended to suggest any limitation as to the scope of use or functionality of the technology described herein. Neither should the computing device 700 be interpreted as having any dependency or requirement relating to any one or combination of components illustrated.

The technology described herein may be described in the general context of computer code or machine-usable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Aspects of the technology described herein may be practiced in a variety of system configurations, including handheld devices, consumer electronics, general-purpose computers, and specialty computing devices. Aspects of the technology described herein may also be practiced in distributed computing environments where tasks are performed by remote-processing devices that are linked through a communications network.

With continued reference to FIG. 7, computing device 700 includes a bus 710 that directly or indirectly couples the following devices: memory 712, one or more processors 714, one or more presentation components 716, input/output (I/O) ports 718, I/O components 720, an illustrative power supply 722, and a radio(s) 724. Bus 710 represents what may be one or more busses (such as an address bus, data bus, or combination thereof). Although the various blocks of FIG. 7 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors hereof recognize that such is the nature of the art, and reiterate that the diagram of FIG. 7 is merely illustrative of an exemplary computing device that can be used in connection with one or more aspects of the technology described herein. Distinction is not made between such categories as "workstation," "server," "laptop," and "handheld device," as all are contemplated within the scope of FIG. 7 and refer to "computer" or "computing device."

Computing device 700 typically includes a variety of computer-readable media. Computer-readable media can be any available media that can be accessed by computing device 700 and includes both volatile and nonvolatile, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program sub-modules, or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage, or other magnetic storage devices. Computer storage media does not comprise a propagated data signal.

Communication media typically embodies computer-readable instructions, data structures, program sub-modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 712 includes computer storage media in the form of volatile and/or nonvolatile memory. The memory 712 may be removable, non-removable, or a combination thereof. Exemplary memory includes solid-state memory, hard drives, and optical-disc drives. Computing device 700 includes one or more processors 714 that read data from various entities such as bus 710, memory 712, or I/O components 720. Presentation component(s) 716 present data indications to a user or other device. Exemplary presentation components 716 include a display device, speaker, printing component, and vibrating component. I/O port(s) 718 allow computing device 700 to be logically coupled to other devices including I/O components 720, some of which may be built in.

Illustrative I/O components include a microphone, joystick, game pad, satellite dish, scanner, printer, display device, wireless device, a controller (such as a keyboard, and a mouse), a natural user interface (NUI) (such as touch interaction, pen (or stylus) gesture, and gaze detection), and the like. In aspects, a pen digitizer (not shown) and accompanying input instrument (also not shown but which may include, by way of example only, a pen or a stylus) are provided in order to digitally capture freehand user input. The connection between the pen digitizer and processor(s) 714 may be direct or via a coupling utilizing a serial port, parallel port, and/or other interface and/or system bus known in the art. Furthermore, the digitizer input component may be a component separated from an output component such as a display device, or in some aspects, the usable input area of a digitizer may be coextensive with the display area of a display device, integrated with the display device, or may exist as a separate device overlaying or otherwise appended to a display device. Any and all such variations, and any combination thereof, are contemplated to be within the scope of aspects of the technology described herein.

A NUI processes air gestures, voice, or other physiological inputs generated by a user. Appropriate NUI inputs may be interpreted as ink strokes for presentation in association with the computing device 700. These requests may be transmitted to the appropriate network element for further processing. A NUI implements any combination of speech recognition, touch and stylus recognition, facial recognition, biometric recognition, gesture recognition both on screen and adjacent to the screen, air gestures, head and eye tracking, and touch recognition associated with displays on the computing device 700. The computing device 700 may be equipped with depth cameras, such as stereoscopic camera systems, infrared camera systems, RGB camera systems, and combinations of these, for gesture detection and recognition. Additionally, the computing device 700 may be equipped with accelerometers or gyroscopes that enable detection of motion. The output of the accelerometers or gyroscopes may be provided to the display of the computing device 700 to render immersive augmented reality or virtual reality.

A computing device may include radio(s) 724. The radio 724 transmits and receives radio communications. The computing device may be a wireless terminal adapted to receive communications and media over various wireless networks. Computing device 700 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include a Wi-Fi® connection to a device (e.g., mobile hotspot) that provides access to a wireless communications network, such as a WLAN connection using the 802.11 protocol. A Bluetooth connection to another computing device is a second example of a short-range connection. A long-range connection may include a connection using one or more of CDMA, GPRS, GSM, TDMA, and 802.16 protocols.

The technology described herein has been described in relation to particular aspects, which are intended in all respects to be illustrative rather than restrictive.

What is claimed is:

1. One or more computer storage media having computer-executable instructions embodied thereon that, when executed by one or more processors, cause the one or more processors to perform a method, the method comprising:
    obtaining a search request including one or more user input search terms to use for performing a search;
    generating, via a computing device, a search query to execute the search, the search query including the one or more user input search terms and a removal parameter indicating a particular search result to exclude from search results returned in response to the search request, wherein the search query is generated by:
        accessing, via a data store, a user profile associated with a user providing the one or more input search terms,
        obtaining the removal parameter included in the user profile, the removal parameter being generated based on a previous user selection, via a previously displayed search results page, indicating to exclude the particular search result from subsequently provided search results, and
        aggregating at least the one or more user input search terms and the removal parameter to generate the search query;
    executing the search using the generated search query having the one or more user input search terms and the removal parameter indicating the particular search result to exclude from search results; and
    in response to executing the search using the generated search query having the removal parameter, providing a set of search results for display via a user device, the set of search results being identified based on execution of the search query and excluding the particular search result.

2. The media of claim 1, wherein the search request is received from a user device based on user input.

3. The media of claim 1, further comprising identifying the removal parameter to include in the search query.

4. The media of claim 1, wherein including the removal parameter in the search query is based on the search request being communicated in association with a search session during which a user selected to exclude the particular search result.

5. The media of claim 1, further comprising:
    obtaining an initial search request including initial search terms to use for performing an initial search;
    providing an initial set of search results for display via the user device, the initial set of search results being identified based on execution of an initial search query generated based at least in part on the initial search request;
    receiving the previous user selection to exclude the particular search result from subsequently provided search results;
    generating the removal parameter; and
    storing the removal parameter in association with the user profile for subsequent use in generating the search query to execute the search.

6. The media of claim 1, wherein the set of search results are concurrently displayed with an indication of the excluded particular search result.

7. A computer-implemented method comprising:

providing a first set of search results, for display via a user device, in response to a first search request;

receiving an indication of a user selection to remove a particular search result from search results;

receiving a second search request;

generating a search query to execute the second search request, the search query including one or more user input search terms and a removal parameter indicating the particular search result to exclude from search results returned in response to the second search request, wherein the search query is generated by:

accessing, via a data store, a user profile associated with a user providing the one or more input search terms, obtaining the removal parameter included in the user profile, the removal parameter being generated based on the indication of the user selection to remove the particular search result from search results, and aggregating at least the one or more user input search terms and the removal parameter to generate the search query;

in response to the search query, providing a second set of search results, for display via the user device, that excludes the particular search result from the second set of search results based on the user selection to remove the particular search result from search results;

receiving a selection to restore the particular search result; and in response to the selection to restore the particular search result, restoring the particular search result to the second set of search results.

8. The method of claim 7, wherein the second search request is communicated from the user device based on the user selection to remove the particular search result from search results.

9. The method of claim 7, wherein the second search request is communicated from the user device based on one or more user input search terms.

10. A computing system comprising:

a processor; and computer storage memory having computer-executable instructions stored thereon which, when executed by the processor, configure the computing system to:

obtain a user selection to remove a product search result from subsequent search results;

obtain a search request including one or more user input search terms to use for performing a search;

generate a search query to execute the search, the search query including the one or more user input search terms and a removal parameter indicating the product search result to remove from search results returned in response to the search query, wherein the search query is generated by:

accessing, via a data store, a user profile associated with a user providing the one or more input search terms, obtaining the removal parameter included in the user profile, the removal parameter being generated based on the user selection to remove the product search result from subsequent search results, and aggregating at least the one or more user input search terms and the removal parameter to generate the search query;

execute a search using the generated search query including the one or more user input search terms and the removal parameter indicating the particular search result to exclude from the subsequent search results;

in response to executing the search query, obtain a set of search results that excludes the product search result; and output the set of search results that excludes the product search result for display via a user device.

11. The computing system of claim 10 further comprising providing, for display, a plurality of search results including the product search result prior to obtaining the user selection to remove the product search result.

12. The computing system of claim 10, wherein the removal parameter is identified based on the search request provided from the user device.

13. The computing system of claim 10, wherein the product search result is excluded from any search results provided for display during a search session in which the user selection to remove the product search result was obtained.

14. The computing system of claim 10, wherein the set of search results are concurrently displayed with an indication of the excluded product search result.

* * * * *